United States Patent [19]

Svanberg et al.

[11] Patent Number: 4,969,229
[45] Date of Patent: Nov. 13, 1990

[54] BATTERY-OPERATED SURFACE TREATMENT APPARATUS HAVING A BOOSTER FUNCTION

[75] Inventors: Joakim A. Svanberg, Johanneshov; Lars G. Kilström, Täby; Lars G. Tuvin, Knivsta; Anders E. C. Larsson, Stockholm, all of Sweden

[73] Assignee: Aktiebolaget Electrolux, Stockholm, Sweden

[21] Appl. No.: 460,168
[22] PCT Filed: Jun. 5, 1989
[86] PCT No.: PCT/SE89/00319
§ 371 Date: Jan. 29, 1990
§ 102(e) Date: Jan. 29, 1990
[87] PCT Pub. No.: WO89/11816
PCT Pub. Date: Dec. 14, 1989

[30] Foreign Application Priority Data
Jun. 6, 1988 [SE] Sweden .................. 8802097

[51] Int. Cl.$^5$ .............................. A47L 9/28
[52] U.S. Cl. ........................ 15/339; 15/344
[58] Field of Search .............. 15/339, 344, 319, 412

[56] References Cited

U.S. PATENT DOCUMENTS

| | | | |
|---|---|---|---|
| 4,535,501 | 8/1985 | Hollowell et al. | 15/339 |
| 4,920,607 | 5/1990 | Köhn | 15/339 |
| 4,920,608 | 5/1990 | Hult et al. | 15/339 |

Primary Examiner—Chris K. Moore
Attorney, Agent, or Firm—Pearne, Gordon, McCoy & Granger

[57] ABSTRACT

A battery-operated surface treatment apparatus having a booster function, preferably a vacuum cleaner, comprises an electric motor (10) which drives a treatment unit, such as a suction fan. Further, the apparatus comprises a battery-powered power supply unit (11) for the motor and, in addition, the apparatus is provided with a coupling device (18,23) for the activation of the booster function by temporarily connecting a separate battery (14) in series with the batteries in the power supply unit (11).

6 Claims, 1 Drawing Sheet

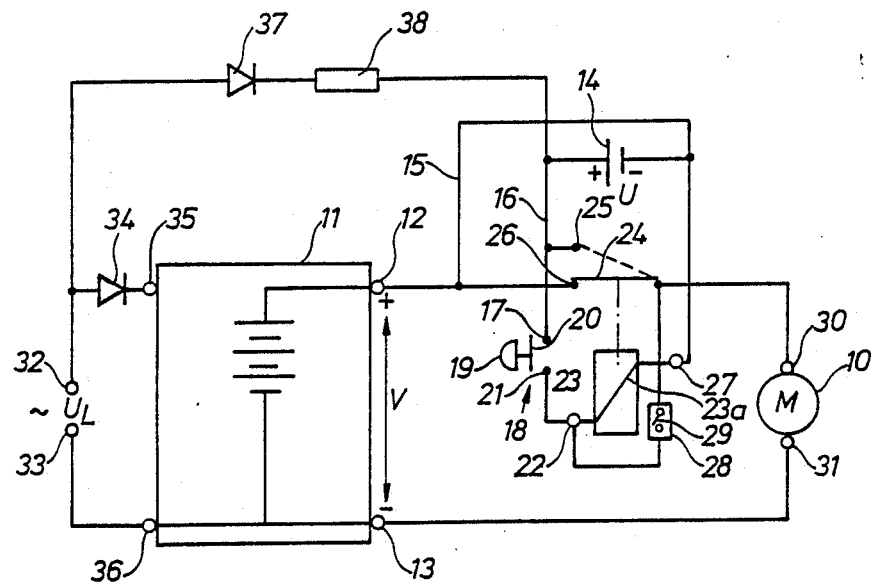

BATTERY-OPERATED SURFACE TREATMENT APPARATUS HAVING A BOOSTER FUNCTION

The present invention refers to a battery-operated surface treatment apparatus having a booster function, preferably a vacuum cleaner, according to the preamble of the appending claim 1.

A vacuum cleaner operated from the mains and having a booster function is described in the Swedish patent specification 449 947. In this connection the booster function is to be understood as a temporary increase of the suction force caused by an increase of the speed of the suction fan. For this purpose the supply voltage of the electric motor that drives the suction fan is increased above the level corresponding to the maximum continuously available power for said motor. As a result the operating temperature of the motor increases and may reach unallowable values in case the booster condition is allowed to continue. Hence, a time control device has been provided limiting the period of operation of the booster function.

In the vacuum cleaner referred to an electronic speed control device has been provided by which the booster function can be activated and by which the speed of the electric motor can be varied by variation of the supply voltage. The object of the invention is to permit the use of the booster function also in battery-operated vacuum cleaners or other battery-operated surface treatment apparatus, in particular those not provided with any electronic speed control device. The object will be achieved in a surface treatment apparatus having the features indicated in claim 1. Preferred embodiments have been indicated in the appending sub-claims.

The invention will now be described more in detail in connection with an embodiment with reference to the enclosed drawing showing a circuit diagram for a battery-operated vacuum cleaner.

For the operation of the electric motor 10 of the vacuum cleaner a power supply unit 11 is provided which comprises a suitable number of batteries. The unit 11 has two output terminals, a positive terminal 12 and a negative terminal 13. The terminal voltage is designated "V".

In order to establish a booster function, i.e. a temporary increase of the speed of the motor 10, it is suggested, in accordance with the invention, to increase the supply voltage by introducing a separate battery 14. The terminal voltage of this battery is designated "U" and is considerably lower than the terminal voltage V. With V amounting to about 12 volts U can be about 3.6 volts. The terminals of the separate battery have been designated "+" and "−" and the negative terminal is connected via a conductor 15 to the terminal 12 of the power supply unit. Via a conductor 16 the positive terminal of the battery is connected to a fixed contact 17 of a starting contact device 18 for the booster function. A movable contact 20 is operated by a knob 19 to connect the contact 18 with an additional fixed contact 21 connected to a terminal 22 of a relay 23. The relay has a movable contact 24 and two fixed contacts 25, 26. When the relay is inactivated the movable contact bears on the contact 26 which is connected to the terminal 12. When the relay is activated, the contact 24 will shift to bear on the contact 25, creating a holding circuit for the relay. An additional terminal 27 is provided on the relay and is connected to the negative terminal of the battery 14. The winding 23a of the relay is connected between the relay terminals 22 and 27. A time control device or timer 28 is connected between the terminal 22 on the relay and the movable contact 24. The switching function of the timer is schematically indicated by a contact 29. The relay contact 24 is connected to a terminal 30 which is one of the two terminals 30, 31 of the motor 10. The terminal 31 is connected to the terminal 13 of the power supply unit 11.

The main battery included in the power supply unit 11 suitably comprises a rechargeable battery and in the example a lead accumulator has been chosen. Suitably, the separate battery 14 is also of the rechargeable type, however, in addition it has to be designed so as to take the large current supplied by the main battery. Further, the separate battery has to supply the additional current required for the booster function. Suitable batteris are of the type nickel-cadmium having a low internal resistance. However, the drawback of such a battery is that it must not be completely discharged as in such case it may be charged backwards by the main current from the unit 11 resulting in the battery being destroyed. In order to protect the battery, suitably, the battery voltage is being watched and in the example the relay 23 has got a design such that the voltage across its winding has to exceed a predetermined value for the relay to be activated. As will be described below the result will be that the booster function can not be connected in case the voltage of the battery 14 is too low.

In the FIGURE there are also indicated simple arrangements for the charging of the rechargeable batteries. A transformer, not shown, supplies on two terminals 32, 33 an AC voltage $U_L$ of 15 volts, for example. A rectifier diode 34 connects the terminal 32 with a terminal 35 for charging voltage on the unit 11. In the same way the terminal 33 is connected to a terminal 36 on the unit 11. The terminal 36 is also connected to the terminal 13. For charging of the battery 14 the terminal 32 is connected to the positive terminal of the battery via a rectifier diode 37 and a resistor 38 connected in series.

The device shown in the drawing operates in the following way. When the booster function is disconnected the power supply unit 11 supplies drive voltage for the motor 10 and a circuit is closed from the terminal 12 via contacts 26, 24 and the motor 10 to the terminal 13.

To activate the booster function knob 19 is operated and a circuit is closed from the positive terminal of the battery 14 via a conductor 16, contacts 17, 20 and 21, the terminal 22, the relay winding 23a to the negative terminal of the battery. If the battery voltage exceeds the predetermined value the relay is activated and the movable contact 24 shifts from the contact 26 to the contact 25. This means that a holding circuit for the relay is closed from the positive terminal on the battery 14 via a conductor 16, contacts 25, 24, the timer contact 29, the terminal 22 and the relay winding 23a back to the negative terminal of the battery. In addition, the battery 14 will be connected in series with the unit 11 increasing the supply voltage to the motor and hence its speed. Thus, a circuit is closed from terminal 12 via conductor 15, the battery 14, conductor 16, contacts 25, 24, the motor 10 to the terminal 13 of the unit 11. After the lapse of a predetermined time the timer 28 is activated and the contact 29 opens causing the current to the winding 23a to be interrupted. Relay 23 drops and disconnects the battery 14 and by that the booster function.

We claim:

1. A battery-operated surface treatment apparatus having a booster function, preferably a vacuum cleaner, comprising a treatment unit driven by an electric motor (10), and a battery-powered supply unit (11) for the motor, characterized by a coupling device (18, 23) arranged to activate the booster function by temporarily connecting a separate battery (14) in series with the batteries for the power supply unit (11), a protecting device (23) being provided to connect the separate battery (14) only if the terminal voltage (U) of said battery exceeds a predetermined value.

2. A surface treatment apparatus according to claim 1, characterized in that the coupling device comprises a relay (23) provided with a holding circuit, said relay being designed so as to be activated for the connection of the holding circuit only if the terminal voltage of the separate battery (14) exceeds the predetermined value.

3. A surface treatment apparatus according to claim 2, characterized in that the coupling device (18,23) co-operates with a time control device (28) which determines the connecting time of the booster function, the time control device (28) having a switching means (29) connected in series with the relay winding (23a).

4. A surface treatment apparatus according to claim 3, characterized in that the power supply unit (11) has a positive terminal (12) and a negative terminal (13), the negative terminal (30) being directly connected to one terminal (31) of the motor (10) and the positive terminal (12) being connected to the other terminal (30) of the motor via the separate battery (14), a starting contact (18) for the booster function and the switching means (29) of the time control device, said other terminal (30) via a shiftable relay contact (24) being connected to the positive terminal (12) of the power supply unit or, alternatively, with activated relay, to the positive terminal of the separate battery (14) which via said starting contact (18) is connected to the relay winding (23a).

5. A surface treatment apparatus according to any of the preceding claims, characterized in that the batteries of the power supply unit (11) and the separate battery (14), respectively, are rechargeable batteries.

6. A surface treatment apparatus according to claim 5, characterized in that the separate battery (14) is of the nickel-cadmium type.

* * * * *